Nov. 17, 1931.  E. GREEN  1,832,702
BUTCHER'S BLOCK STOP PLATE
Filed July 19, 1930  2 Sheets-Sheet 1
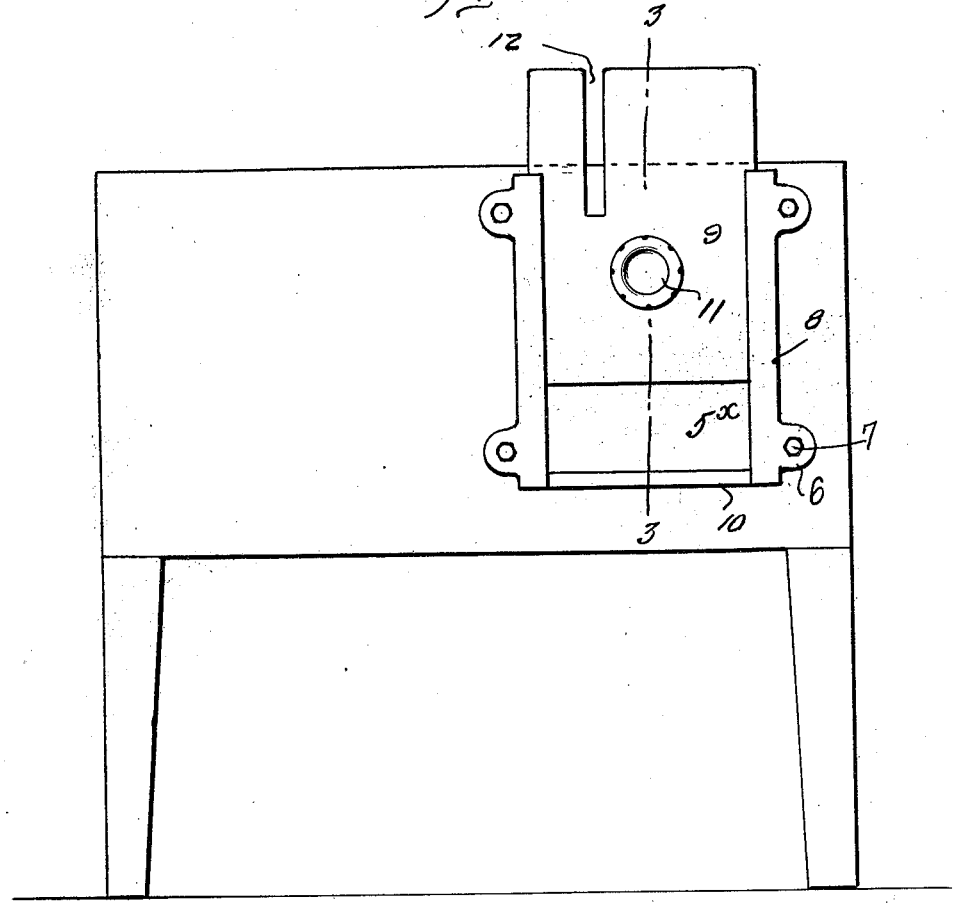
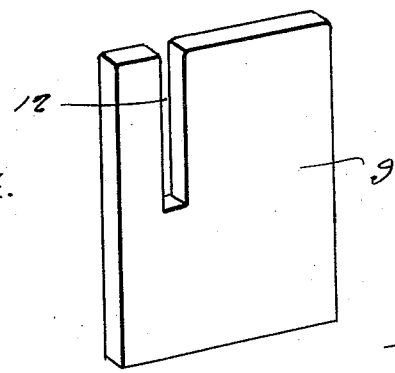
Inventor
Elmer Green
By Clarence A. O'Brien
Attorney Nov. 17, 1931.  E. GREEN  1,832,702
BUTCHER'S BLOCK STOP PLATE
Filed July 19, 1930  2 Sheets-Sheet 2
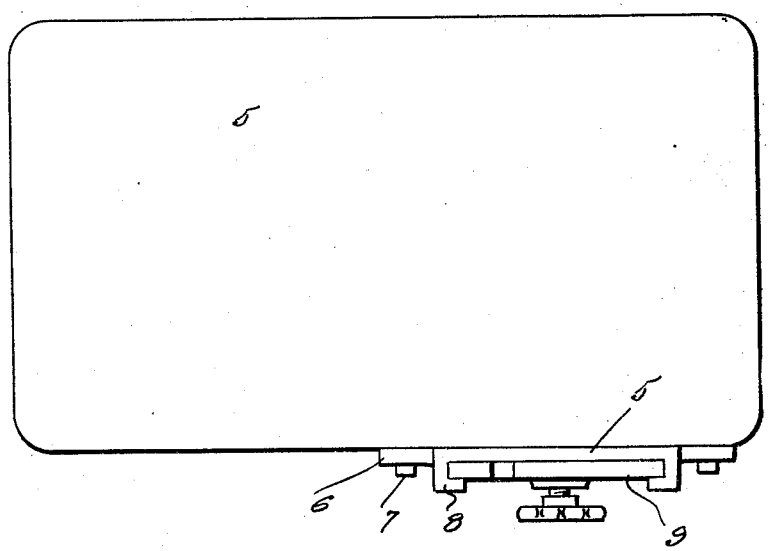
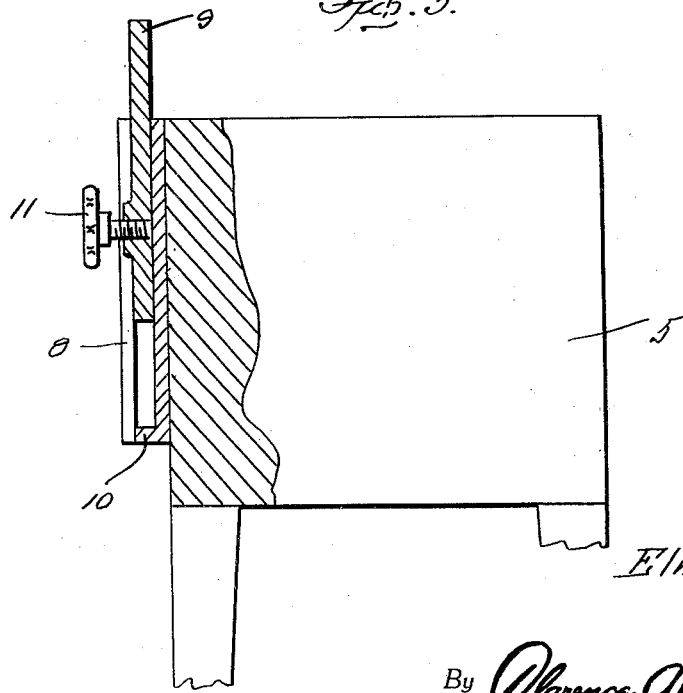
Inventor
Elmer Green
By Clarence A. O'Brien
Attorney Patented Nov. 17, 1931

1,832,702

UNITED STATES PATENT OFFICE

ELMER GREEN, OF HICKSVILLE, NEW YORK, ASSIGNOR OF ONE-TENTH TO WILLIAM BRAUN, OF HICKSVILLE, LONG ISLAND, NEW YORK, AND ONE-FOURTH TO HENRY McINTOSH, OF HICKSVILLE, NEW YORK

BUTCHER'S BLOCK STOP PLATE

Application filed July 19, 1930. Serial No. 469,209.

The present invention relates to a butcher's block stop plate and has for its prime object to provide means against which a piece of meat may be held while the bone is being sawed.

Another very important object of the invention resides in the provision of a stop plate of this nature mounted so that the same may be easily and quickly raised into operative position or moved down to an entirely out of the way inoperative position.

A still further very important object of the invention resides in the provision of a device of this nature which is exceedingly simple in construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a meat block with my device thereon,

Figure 2 is a top plan view thereof,

Figure 3 is a sectional view taken substantially on the line 3—3 of Figure 1, and Figure 4 is a perspective view of the stop plate.

Referring to the drawings in detail it will be seen that the numeral 5 denotes a conventional meat block, on one side of which is fastened a plate 5x having ears 6 through which pass suitable fastening elements 7. This plate 5x is provided with straight parallel side vertical guides 8 for receiving the stop plate 9 so that the same may be raised to extend above the meat block as is shown in Figures 1 and 3 or may be lowered to an out of the way position.

A stop flange 10 is provided at the bottom of the plate 5x on which the stop plate 9 may rest when in its lowermost, idle position. A set screw 11 is threaded through the plate 9 to bind against the plate 5x for holding the plate 9 in the desired adjusted raised position. The plate 9 is provided with a slot or notch 12 through which the saw may operate.

It is thought that the construction, utility and advantages of this invention will now be quite apparent to those skilled in this art without a more detailed description thereof.

It should be noted, however, that when the stop plate 9 is lowered to the fullest extent, the top of the block 5 will be left entirely free from obstructions; also, that when the stop plate 9 is raised as in Figures 1 and 3, an efficient abutment against which a piece of meat may be placed and held against movement in one direction, is afforded and this without interfering with convenient use of the saw which may be manipulated through the notch 12 in the stop plate 9.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be restorted to without departing from the spirit or scope of the invention as hereinafter claimed or sacrificing any of its advantages.

Having thus described my invention, what I claim as new is:

In combination, a meat block having a flat top surface, a plate attached to the sides of said block and having its upper end substantially flush with the upper surface of the block and also having a flange at its lower end and vertical guides on its side edges, a stop plate movable vertically in said side of the plate and alongside said plate and having a substantially vertical notch in its upper portion adapted for the play of a saw when the stop plate is extended above the upper side of the block, and a screw threaded in the stop plate and adapted to be set against the first named plate and having a handle at its outer end adapted for the manipulation of the screw and also adapted to facilitate raising and lowering of the stop plate.

In testimony whereof I affix my signature.

ELMER GREEN.